United States Patent [19]

Heshmat

[11] Patent Number: 4,531,845
[45] Date of Patent: Jul. 30, 1985

[54] BEARING LUBRICATION DEVICE
[75] Inventor: Hooshang Heshmat, Latham, N.Y.
[73] Assignee: Reliance Electric Company, Greenville, S.C.
[21] Appl. No.: 569,526
[22] Filed: Jan. 9, 1984
[51] Int. Cl.³ .......................... F16C 33/10; F16N 7/16
[52] U.S. Cl. .................................... 384/406; 184/11.5
[58] Field of Search ................. 308/85 A, 85 B, 245, 308/187; 384/404, 405, 406; 184/11.5

[56] References Cited

U.S. PATENT DOCUMENTS

| | | | |
|---|---|---|---|
| 905,631 | 12/1908 | Bascome et al. | 384/406 |
| 997,724 | 7/1911 | Wiebens | 384/406 |
| 1,230,651 | 6/1917 | Bechtel | 384/406 X |
| 1,453,158 | 4/1923 | Minney | 308/85 B |
| 2,212,661 | 8/1940 | Harper | 384/406 |
| 2,386,963 | 10/1945 | Lower | |
| 3,098,683 | 7/1963 | Jernberg | 308/245 X |
| 3,294,457 | 12/1966 | Johnson | 384/404 |
| 3,806,210 | 4/1974 | DeLeu | |
| 3,857,462 | 12/1974 | Kaufman et al. | 308/85 B X |

Primary Examiner—Stuart S. Levy
Assistant Examiner—Thomas R. Hannon
Attorney, Agent, or Firm—Marmaduke A. Hobbs

[57] ABSTRACT

A bearing lubrication device for use in ring-oiled journal bearings and the like in which a generally circular ring member is disposed around the rotatable shaft in the bearing assembly and has a circumferential groove in its inner surface. A cantilevered leaf member projects into the groove in the ring member to separate the lubricant from the ring as rotation occurs, thus providing greater lubricant delivery, improved bearing performance capability, and stabilized performance at high journal speeds.

14 Claims, 10 Drawing Figures

BEARING LUBRICATION DEVICE

BACKGROUND OF THE INVENTION

Oil rings are extensively used as conduit means for carrying oil or other lubricant from a reservoir to moving members, such as journal bearings, shafts, and the like. In operation, the oil ring is normally loosely disposed around the shaft and rotates as the shaft rotates, through contact with the shaft. The lubricant is carried from a sump or reservoir to the shaft, in the contours or grooves of the oil ring and by frictional attraction as the ring moves through the reservoir. The lubricant is deposited on the shaft or other member through the gravitational, frictional, and centrifugal forces inherent in the operation. Under conditions of slow rotation, the gravitational and frictional forces generally deliver a sufficient supply of lubricant; however, at higher velocities, which can be as high as 3000 to 4000 ft./min., the oil ring is either moving too fast for gravity to effect dispersion of the oil, or the centrifugal force on the ring and the oil is too great to overcome, and the oil either remains on the ring or is thrown outside of the rotational field. Thus, the lubricant does not reach the desired area, resulting in early wear and possible failure of the shaft, bearing, oil ring, or other associated members.

The rotation of the ring depends on a propulsive force developed between the rotating shaft and the ring. As speeds increase, a fluid film is developed, and the driving force is transmitted to the ring by this lubricant film. The situation is analogous in many ways to that in a floating ring bearing and, without a direct drive mechanism, a slippage occurs. Prior attempts to develop a higher frictional coefficient and, thus, a more positive drive mechanism, have focused on modification of the geometry of the inside circumference of the ring. Factors opposing the ring's rotation are the drag on the lower portion of the ring which is submerged in the lubricant reservoir, the force required to lift the lubricant from the reservoir toward the top of the journal, and the frictional drag on the ring applied by close-running stationary surfaces, such as the sides of the ring slot in the bearing. Other factors affecting lubricant delivery include the composition of the ring and the viscosity of the lubricant used in the bearing. In addition, since a conventional oil ring rests on the upper surface of the shaft during operation and during periods of non-use, much wear results from the contact alone. When at rest, most of the lubricant drains back into the reservoir and very little lubricant protection is available for the start-up operation. Thus, until the lubricant film is reestablished, early wear of the shaft, ring, bearings, and other associated members is likely to occur. This, in turn, leads to repair and replacement expenses, and the concomitant loss of operating time.

SUMMARY OF THE INVENTION

It is, therefore, one of the principal objects of the present invention to enhance the lubricating ability of oil rings, thereby increasing the capability and the capacity of thrust and journal bearings, by providing a bearing lubrication device having an oil ring and cantilevered oil leaf assembly in which the cantilevered leaf acts to scrape the lubricant from the contours or grooves in the oil ring, directing and depositing the lubricant in the desired areas around the shaft, bearings, and the ring itself.

Another object of the present invention is to reduce the speed of rotation of the oil ring, thereby providing increased lubricant delivery, utilizing the effective braking property provided by the action of the cantilevered oil leaf against the lubricant flow carried from the reservoir by the ring, and to increase the distribution of the lubricant due to the configuration of the ring and the diverging wedge configuration of the oil leaf.

A further object of the present invention is to provide spring support to the oil ring, and to prevent the excessive rocking motion which characterizes prior oil ring embodiments by providing a means for minimizing contact between the ring and the shaft, before and during operation, thereby minimizing start-up wear of the oil ring, shaft, and bearings, and increasing the useful life of these members.

A still further object of the present invention is to provide an oil ring and cantilevered oil leaf assembly which is usable with most or all devices currently employing conventional oil rings, and which is economical to produce and to use.

These and other objects are attained by the present invention which relates to a bearing lubrication device for use in ring-oiled journal bearings and the like, which have a rotatable shaft, a bearing surface, and a lubricant reservoir, said device having a generally circular ring member for carrying lubricant from the reservoir for deposition on the shaft and the bearing surface. The ring member rotates with the shaft, and a means is provided for separating the lubricant from the ring so that a greater lubricant delivery is attained than was possible with conventional oil rings. For bi-directional journal bearings, a second lubricant collection means may be added opposite the first means for directing the lubricant onto the shaft, bearing surfaces, and into the bearing axis feeder grooves, where present.

Various other objects and advantages of the present invention will become apparent from the description below, with reference to the accompanying drawings.

DETAILED DESCRIPTION OF THE PREFERRED EMBODIMENT

Figure 1:
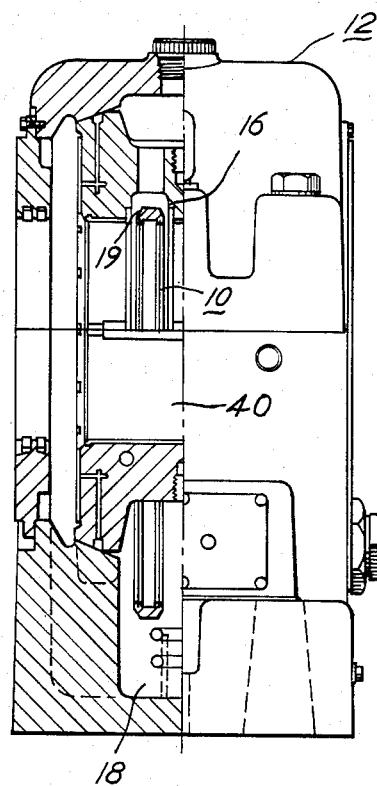
FIG. 1 is a side elevational view, shown partially in cross-section, of a pillow block-type journal bearing assembly with the bearing lubrication device embodying the present invention disposed around the shaft of the bearing assembly.

Referring now more specifically to the drawings, and to FIG. 1 in particular, numeral 10 designates generally the bearing lubrication device embodying the present invention. The device is shown here disposed in a journal bearing 12, although its application is not limited in any way thereto. The assembly can normally be used wherever conventional oil rings are used for lubrication purposes, and in a variety of different devices. In normal operations with bearings of the type shown, the oil ring 19 is loosely disposed around a rotatable shaft 14, and rotates therewith in a manner to be explained below. The oil ring rotates in a ring slot 16, through a lubricant reservoir 18 and, as rotation occurs, carries the lubricant upwardly for deposition on the shaft and the bearing surfaces.

Figure 3:
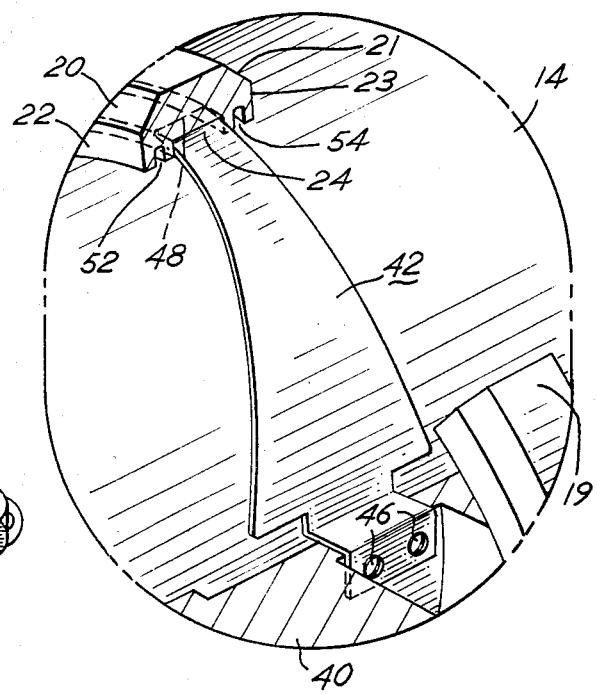
FIG. 3 is an enlarged, perspective view, shown partially in cross-section, of the oil ring and cantilevered oil leaf embodying the present invention, showing the contours of the ring, the section being taken from circle 3 of FIG. 2.

FIG. 1 shows a partial cross-section of the oil ring 19 embodying part of the present invention. One of the limiting factors in attaining higher oil delivery and a stable operating condition with oil rings, is the configuration of the outer surface. With the present invention, the relative angle of angular sides 20 in conjunction with the length of vertical sides 22 was found to have the greatest impact on oil delivery, shown here in FIG. 3. As the angle of sides 20 approached zero degrees (0°), the side drag of the ring in ring slot 16 approached the maximum possible. This caused the ring to operate erratically due to the greater side drag, and oil delivery was reduced due to insufficient ring speed. As the angle of sides 20 is increased, consequently shortening the length of sides 22, oil delivery increases accordingly and the lubricant is thrown off the ring by the rotational forces in the form of a splash or spray. Through experimentation, the optimum angle for angular sides 20 was found to be approximately thirty degrees (30°), regardless of the diameter of the ring or the depth of the inside groove, here designated by numeral 24.

At low journal speeds, the oil ring follows the journal and they have approximately the same peripheral speed. As the speed of shaft 14 increases, a transition point is reached, at which a hydrodynamic lubricant film begins to become established, substantial slippage occurs, and an appreciable decline in oil ring speed is found. The ring speed at this transition point is considered to be the primary speed of the ring with respect to the journal speed, designated by $N_1$ in FIG. 8. The relationship at this point is $dU_r/dU_s = 0$, for $U_r = N_1$, where $N_1$ equals the oil ring primary speed, $U_r$ equals the surface velocity of the inside diameter of the ring 19, and $U_s$ equals the surface velocity of the journal.

Figure 8:
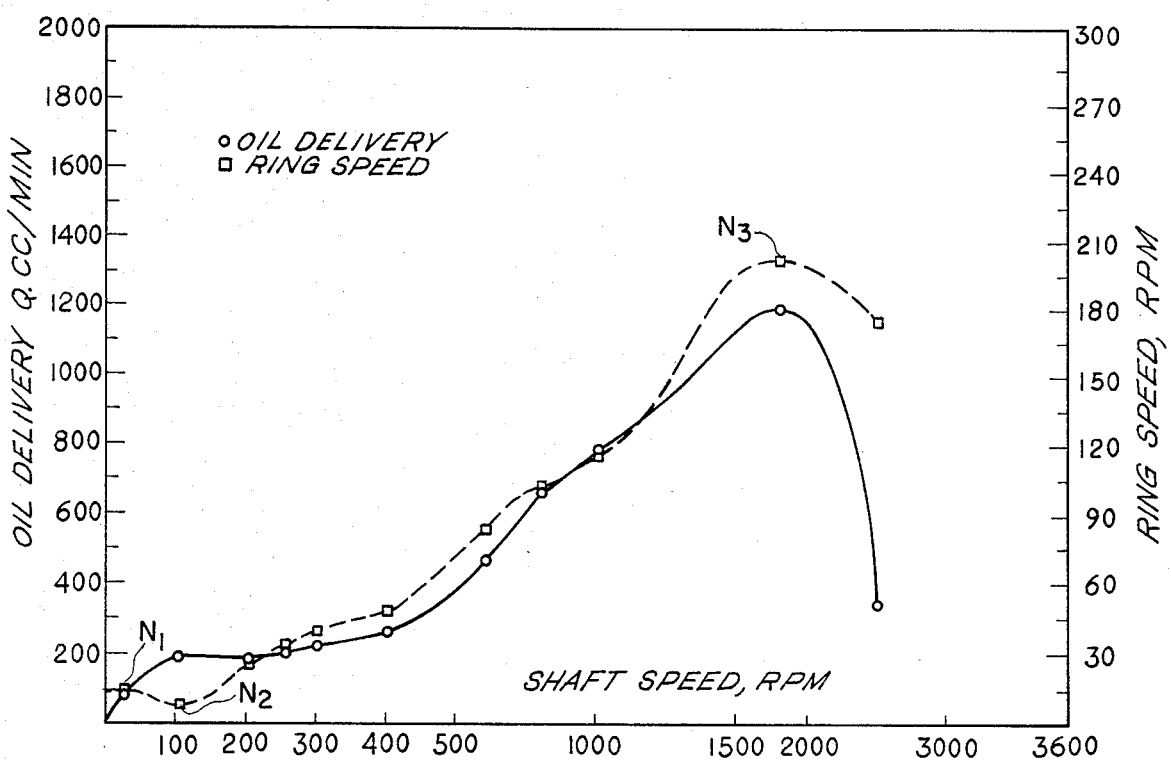
FIG. 8 is a graph of the relationship between the shaft speed, the ring speed, and the oil delivery for the oil ring alone, which constitutes a part of the present invention.

The primary speed of the oil ring is a combined function of ring weight, shape, projected areas of contact, journal speed, lubricant viscosity, and localized temperature. As journal speed increases, thus increasing the speed of the ring above the primary speed, a hydrodynamic lubricant film is definitely established between the ring and the journal. The point where the actual rotating speed of the ring is a balance between the propulsive force at the region of contact between the ring and the journal, and the resistive force of the lubricant drag on the ring, is designated the secondary speed or $N_2$. This point is also shown in FIG. 8 and the relationship is expressed as $dU_r/dU_s = 0$ where $U_r = N_2$. The secondary speed is also a function of many parameters, including journal speeds, oil viscosity, ring submersion level, and ring shape. For example, the greater the length of vertical side 22, the lower the secondary speed $N_2$.

Above the secondary speed, lubricant delivery increases very rapidly with increasing ring speed. Also, as the journal speed continues to increase, the ring is driven entirely by hydrodynamic action through a thicker lubricant film. As more lubricant is drawn from the reservoir, the drag decreases due to the decreased dynamic submersion level of the ring in the lubricant reservoir because of the faster rotation. During testing, various rings at a particular shaft speed exhibited an excessive vibration above the secondary speed $N_2$. The modes of vibration could be readily observed, and they were translatory, conical, and oscillatory modes, where vibration was initiated with an oscillatory mode. The amplitude of the vibration grows as shaft speed increases. This particular ring speed is considered the tertiary speed of the ring, designated as $N_3$ on FIG. 8. The tertiary ring speed $N_3$ is believed to be the first, rigid-body, critical speed of the ring.

As journal speeds increase above the tertiary speed and into the unstable region, the unstable motion of the ring triggers the throw-off of lubricant from both ring and journal. This throw-off and spray become so vigorous that lubricant delivery drops rapidly, as shown in FIG. 8. Above the tertiary speed $N_3$, regardless of journal speed, the rotational speed of the ring either remains constant or falls. Several specific factors influence this tertiary speed, including the ring shape, the ring-bore configuration which strongly controls the hydrodynamic stiffness of the ring, the weight or mass of the ring, and the ring diameter; for example, a larger ring has a lower tertiary speed. The effects of changes in lubricant viscosity on ring speed and lubricant delivery were studied using lubricants of SAE 10, 20, and 30 wt., and it was found that viscosity affected the primary and secondary speeds of the ring; however, tertiary speed was found to be independent of viscosity.

Various materials may be used in the fabrication of ring 19, including brass, Muntz (60% Cu, 40% Zn), and bronze (SEA-660). Tests conducted on these materials using lubricant SAE 10 at 100° F. and a ring submersion level at 15% of the ring diameter, indicated that bronze attained an oil delivery approximately 10% higher than the others tested. Tests of the wear properties, consisting of 30,000 start-stop cycles and 7,200 hours of continuous running at 1800 rpm, with lubricant SAE 10, indicated less wear with the brass ring, but differences were slight.

Referring back to FIG. 2, oil ring 19 is shown disposed around shaft 14. The shaft is rotatable in bearing member or liner 40, which may be of any suitable type and, in the embodiment shown, rotation is in the direction of the arrow. A means for separating the lubricant from the ring or cantilevered oil leaf 42 (C.O.L.) is secured to the liner with suitable fasteners, such as screws 46. The leaf 42 has a diverging wedge-shaped configuration and is mounted in a unidirectional bearing, such that the direction of rotation of shaft 14 is toward and into the free end 48 of the leaf. The free end 48 is disposed in the groove 24 of ring 19 and the leaf may be composed of any suitable material, such as steel foil. The design was optimized experimentally, and foil with a thickness of approximately 0.5 mm and an arc of approximately 70° was found to give optimum performance for any ring and journal combination. The curved foil is preloaded by 10% of the weight of the ring and assumes approximately the position designated by 50A in FIG. 4 when the apparatus is at rest, thereby allowing the outer edges of ring 19 to contact shaft 14. As rotation of the shaft and ring occurs, lubricant is carried upwardly from reservoir 18 by inside groove 24 and two outside grooves 52 and 54, one on each side of ring 19. The lubricant is collected and scraped from groove 24 by leaf 42, whereupon the lubricant is deposited on and against the shaft and bearing surfaces. Preloading of the cantilevered leaf 42 provides spring property which minimizes the contact between the ring and the shaft, thereby minimizing start-up wear of the elements, and aiding in stabilizing the ring during high speed operation.

Figure 2:
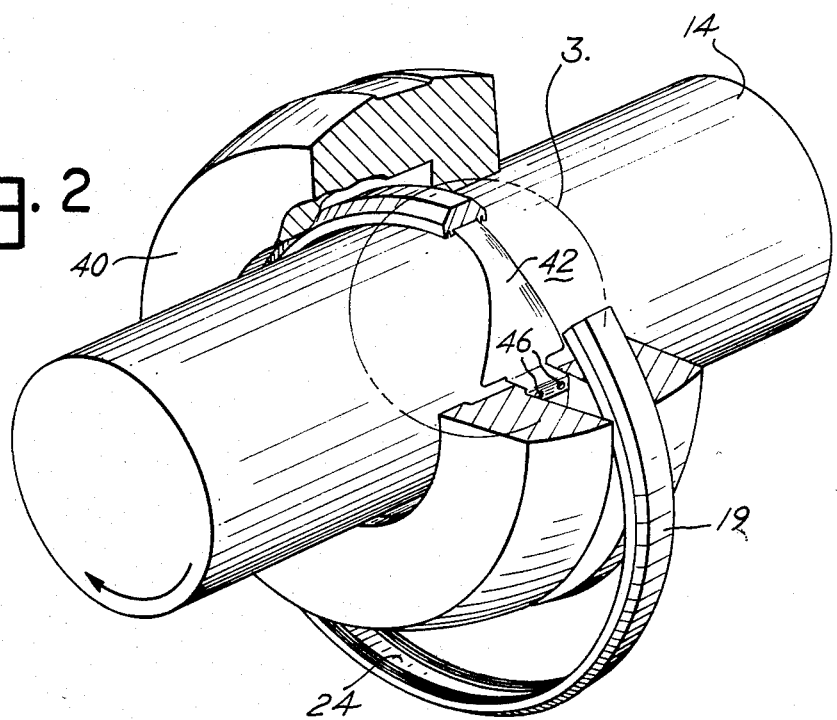
FIG. 2 is a partial perspective view of the bearing lubrication device embodying the present invention, shown here installed in a pillow block-type bearing, with a portion of the bearing structure broken away, revealing the orientation of the oil ring and cantilevered oil leaf with respect to the shaft.
Figure 4:
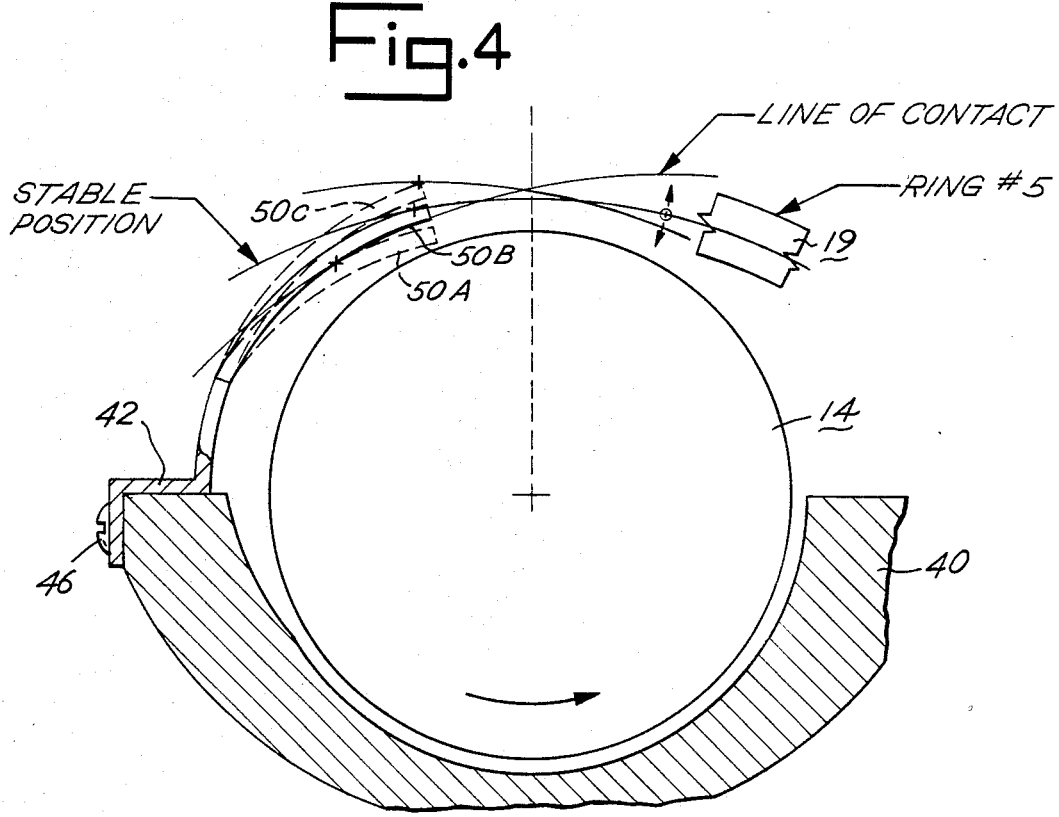
FIG. 4 is a partial, schematic and graphical representation of the various positions assumed by the cantilevered oil leaf for a shaft rotatable in one direction only.

As shown in FIGS. 2 and 4, the rotation of the journal and ring is normally toward the fixed end of the leaf. Due to the wide configuration of the leaf at the fixed end, the stiffness of the leaf increases from the leading edge to the fixed end. This wide structure also serves to collect the scraped lubricant and direct it to the axial spreader groove (not shown) of the bearing during ring operation. The leading or free end 48 of the leaf, and its position in groove 24, provide a tracking effect on the ring, thereby preventing excessive side drag of the ring in ring slot 16. In addition, the free end provides external damping and stiffness to the ring, due to hydrodynamic pressure generation between the leaf and the ring. As ring speed increases with increasing journal speed, and more lubricant is carried upwardly by the ring, the leaf is forced outwardly, approximately to position 50B in FIG. 4. The outward movement thereby produces a diverging wedge configuration, which provides, with the hydrodynamic oil pressure generated, a braking mechanism to the ring, stabilizing it during high speed operation while increasing oil delivery. This eliminates the need to machine various numbers of grooves in the ring for various journal speeds and sizes. As journal speeds increase even further, the divergence effect becomes more pronounced. The ring assumes approximately the position indicated by 50C in FIG. 4, which is the desired effect, since the more pronounced divergence produces an even better stabilizing influence and a slower ring speed at higher journal speeds. Thus, stability is inherent at higher ring speeds with an oscillatory motion, due to the diverging wedge configuration.

Figure 5:
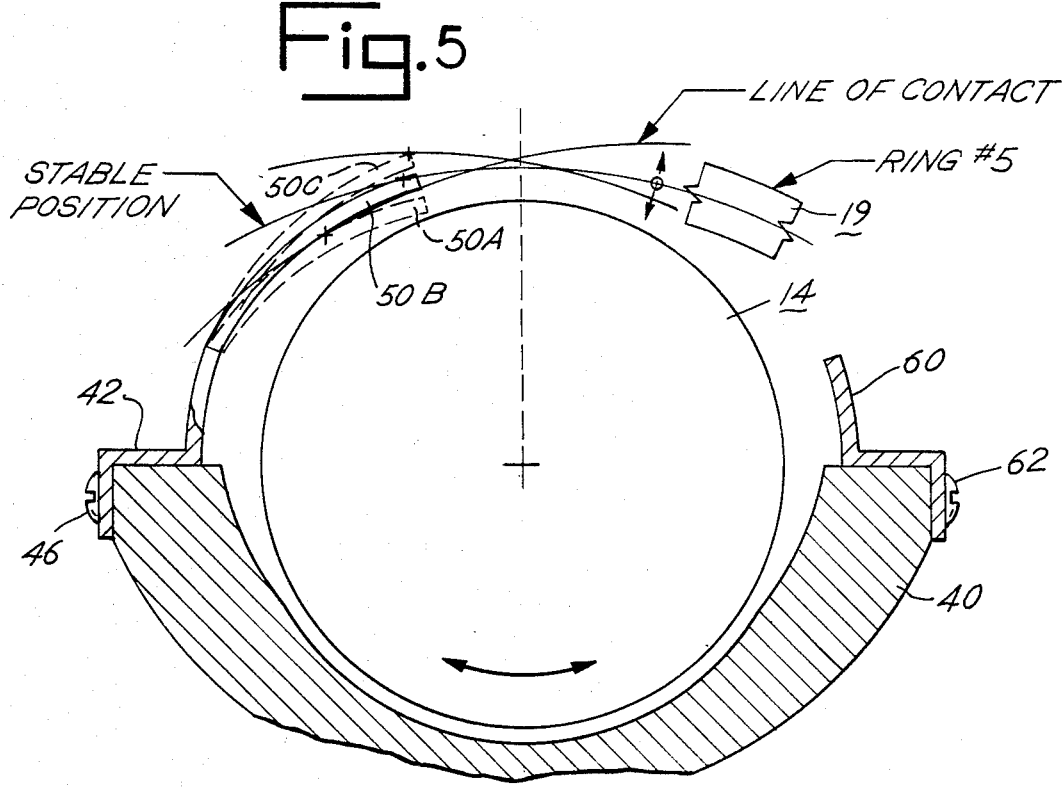
FIG. 5 is a partial, schematic and graphical representation of an alternative embodiment of the present invention, showing the various positions assumed by the cantilevered oil leaf on one side of the bearing structure and a separate oil collector leaf opposite the cantilevered leaf, for a shaft rotatable in both directions.
Figure 6:
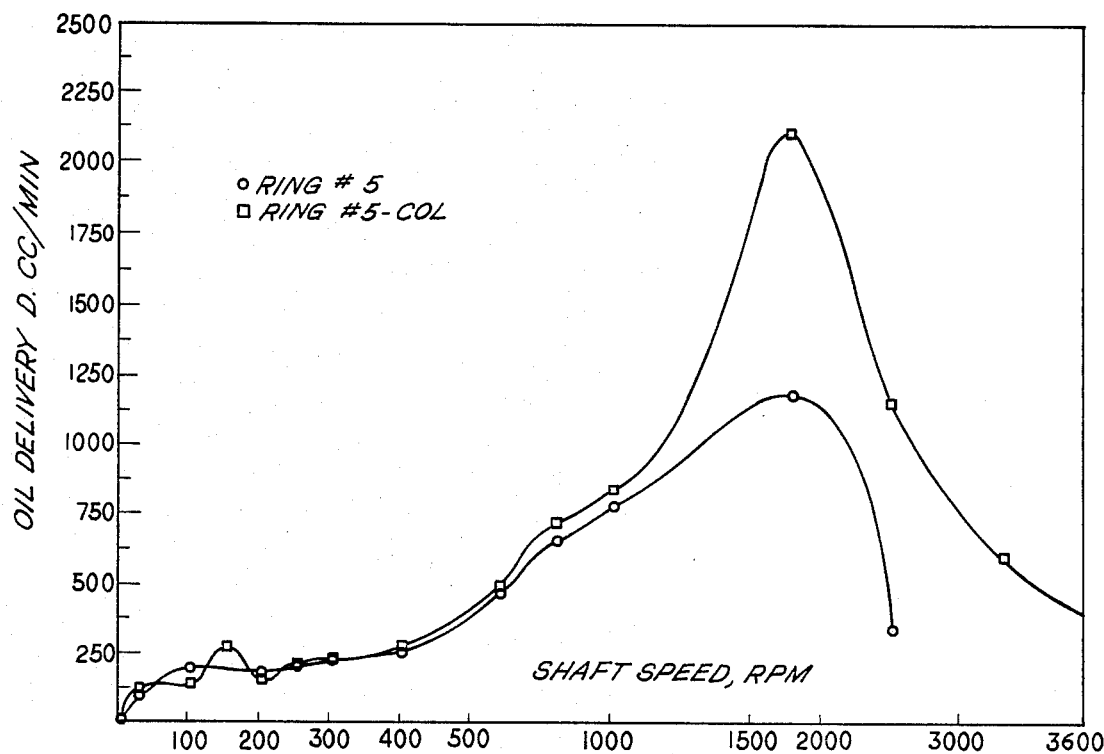
FIG. 6 is a graph of the relationship between the shaft speed and the oil delivery for an oil ring alone, and for an oil ring with a cantilevered oil leaf.
Figure 7:
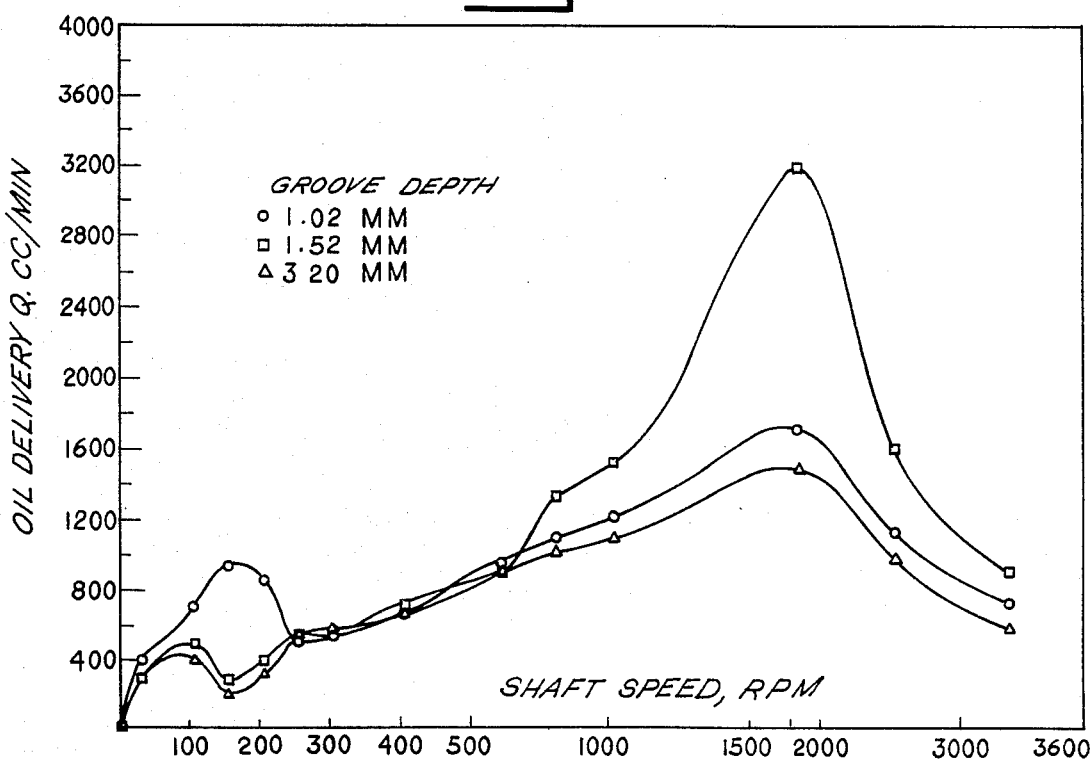
FIG. 7 is a graph of the relationship between the shaft speed and the oil delivery for three oil rings, each with a cantilevered oil leaf, the rings having various groove depths.
Figure 9:
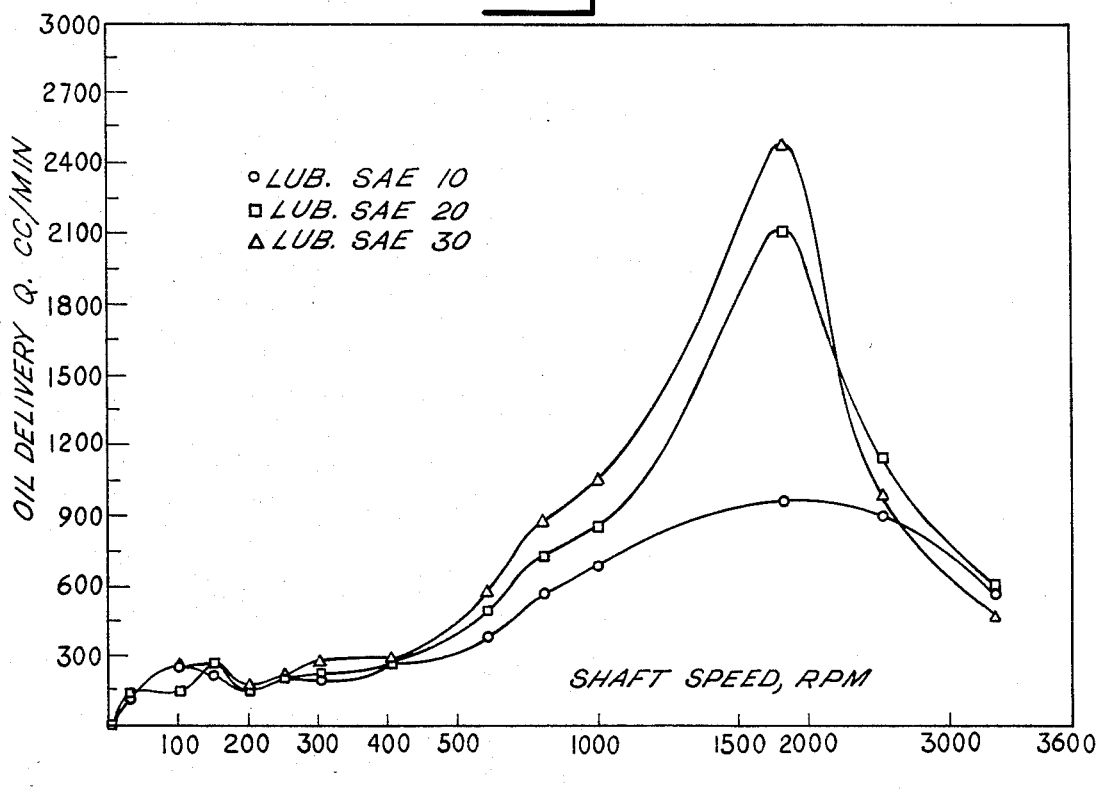
FIG. 9 is a graph of the relationship between the shaft speed and the oil delivery for three lubricants of different viscosity used with the present invention.
Figure 10:
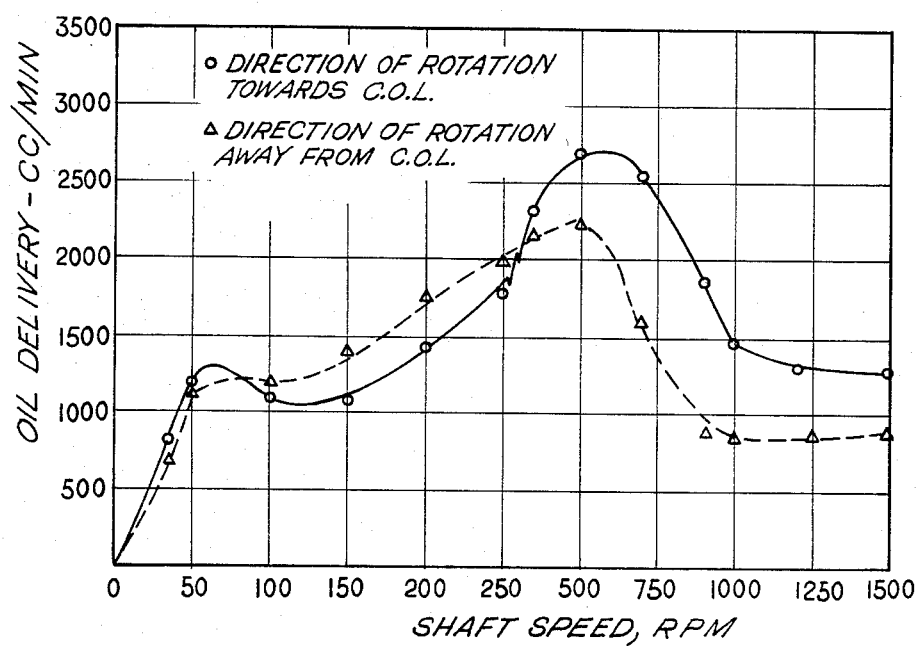
FIG. 10 is a graph of the relationship between the shaft speed and the oil delivery for a shaft rotatable in both directions, for a journal bearing using the oil ring, cantilevered oil leaf, and the oil collector leaf shown in FIG. 5.

The effects of varying the depth of groove 24 on lubricant delivery for various shaft speeds are plotted in FIG. 7. The three rings tested were identical, except for the variance in inside groove depth where groove depth was D=1.05 mm, D=1.52 mm, and D=3.20 mm. From this data, an optimum depth of approximately 1.52 mm was selected, providing approximately twice the oil delivery of rings having shallower or deeper grooves. The ring 19, with an approximate depth of 1.52 mm, was designated ring #5 and was tested with and without the cantilevered oil leaf 42. The results are plotted in FIG. 6. In conducting the test on the ring without the leaf, instability set in at an approximate journal speed of 1800 rpm and an approximate ring speed of 180 rpm, and the journal could be run no higher than approximately 2500 rpm. Ring oil delivery was limited to approximately 1200 cc/min. Testing of the same ring with leaf 42 allowed journal operation up to and above approximately 3200 rpm, with an oil delivery of approximately 2100 cc/min. at 1800 rpm, and an achievable oil delivery of approximately 3200 cc/min. at 1800 rpm, the latter plotted in FIG. 7. Both tests plotted in FIGS. 6 and 7 were run with SAE 20 wt. lubricant. The increased oil delivery seen in FIG. 7 can therefore be attributed to a higher lubricant temperature, which in the test shown in FIG. 7 was 48.8° C. at the inlet, whereas in the test shown in FIG. 6, the lubricant temperature was 37.8° C. at the inlet. The effects of variance in lubricant viscosity are plotted in FIG. 9 for lubricants having SAE ratings of 10, 20, and 30 weight. As seen, the heavier lubricants showed marked increases in oil delivery, an important and desirable factor, especially in large bearing applications where the use of heavier lubricants and higher speeds are common.

Where journal bearings have bi-directional capability, an additional collector means such as collector leaf 60 is secured to the bearing liner 40 using suitable fasteners such as screws 62, the leaf 60 disposed opposite cantilevered leaf 42, shown in FIG. 5. The collector leaf directs delivered lubricant into the bearing axis feeder groove (not shown), where it is distributed, eventually returning to the reservoir to be picked up by the oil ring and recycled. Oil delivery, as a function of shaft speed for a bi-directional journal bearing, is plotted in FIG. 10 for rotation toward and away from the cantilevered leaf 42, or C.O.L. While a slight drop in oil delivery is observed, delivery is still increased over that for a conventional oil ring alone. Therefore, it is desirable to include the collector 60 in a bi-directional bearing, possibly eliminating the need for an external lubrication system. Where the external system is required regardless, due to size of the bearing or other factors, the addition of the collector is still advisable due to the rapid increase in oil delivery observed from the start of operation, thereby minimizing start-up wear of the bearing, shaft, and ring itself.

While one embodiment of a bearing lubrication device and a modification thereof have been shown and described in detail herein, various other changes and modifications may be made without departing from the scope of the present invention.

I claim:

1. In combination, a bearing member structure, a rotatable shaft journaled horizontally in said member structure, a lubricant reservoir disposed beneath said shaft, a generally circular ring member of a substantially larger diameter than said shaft disposed eccentrically around said shaft and supported by the upper side of said shaft in substantially an area of closest proximity thereto, and extending into said reservoir for transferring lubricant from said reservoir to the surface of said shaft during rotation thereof, and means extending into the ring member to a point near the area of closest proximity between an inner surface of the ring member and said shaft for facilitating transfer of lubricant from the ring member to the shaft surface as said ring member is rotated by said shaft.

2. The combination as defined in claim 1 in which said means for facilitating transfer of the lubricant from said ring member includes a cantilevered leaf member having a generally wedge-shaped configuration with a narrow free end, and a wide fixed end connected to the bearing member structure.

3. The combination as defined in claim 2 in which said ring member has a grooved inner surface for receiving said free end of said cantilevered leaf member, and said cantilevered leaf is mounted such that the shaft normally rotates toward said free end.

4. The combination as defined in claim 3 in which said cantilevered leaf member has a convex outer surface with an arc of approximately seventy degrees for curving above and around the shaft.

5. The combination as defined in claim 1 in which said ring member has a generally flat outer surface and right and left sides angling away from said outer surface at an approximate thirty degree angle for a certain defined distance and then angling radially inwardly, approximately perpendicular to said outer surface.

6. The combination as defined in claim 5 in which said means for facilitating transfer of the lubricant from said ring member includes a cantilevered leaf member having a relatively wide fixed end and a relatively narrow free end, with said fixed end being secured to the bearing member structure.

7. The combination as defined in claim 6 in which said ring member has a grooved inner surface with a center groove and two outer grooves, one on each side of said center groove, said surface partially defined by said right and left sides for receiving said free end of said cantilevered leaf member.

8. The combination as defined in claim 7 in which said device includes a lubricant collector leaf disposed opposite said cantilevered leaf member and secured to the bearing member structure for directing lubricant to a bearing surface.

9. A bearing lubrication device for use with ring-oiled journal bearings having a horizontally disposed shaft rotatable in either direction, a bearing structure with bearing liners for receiving the shaft, and a lubricant reservoir beneath said shaft, said device comprising a generally circular ring member which is eccentrically supported by the upper side of said shaft in substantially an area of closest proximity thereto and which rotates in the direction of shaft rotation, said ring member having a groove in an inner surface for carrying lubricant from the reservoir to the shaft and bearing liner, and means having a part extending into and parallelling said groove in the inner surface of said ring member at a point near the area of closest proximity between said ring member and said shaft, for separating the lubricant from said grooved surface of said ring member and depositing it on the shaft adjacent the bearing liners.

10. A bearing lubrication device as defined in claim 9 in which said means for separating the lubricant from said ring member includes a cantilevered leaf member having a fixed end and a free end, with said fixed end secured to the bearing structure, and said free end includes said part extending into and parallelling said groove in the inner surface of said ring member.

11. A bearing lubrication device as defined in claim 10 in which said ring member has a generally flat outer surface and right and left sides angling away from said outer surface at an approximate thirty degree angle for a certain defined distance and then angling downwardly approximately perpendicular to said outer surface.

12. A bearing lubrication device as defined in claim 10 in which a lubricant collector leaf is disposed opposite said cantilevered leaf member and secured to the bearing structure for directing lubricant to the bearing surface.

13. A bearing lubrication device as defined in claim 10 in which said cantilevered leaf member is yieldable and has an arcuate longitudinal configuration, and said fixed end is relatively wide and said free end is relatively narrow.

14. A bearing lubrication device as defined in claim 13 in which said cantilevered leaf member has a convex outer surface with an arc of approximately seventy degrees and has a common thickness from said wide end to said narrow end and is composed of steel foil with a thickness of approximately 0.5 mm.

* * * * *